M. E. FULD.
ELECTRIC BATTERY CELL.
APPLICATION FILED MAR. 12, 1906.
960,222.
Patented May 31, 1910.
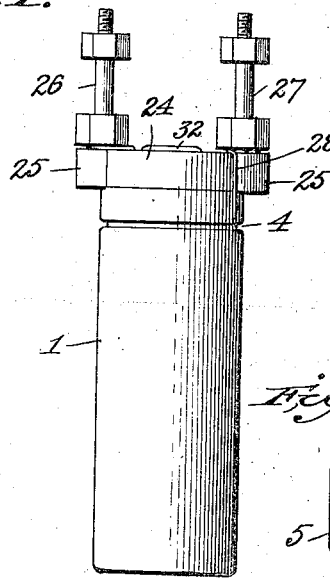
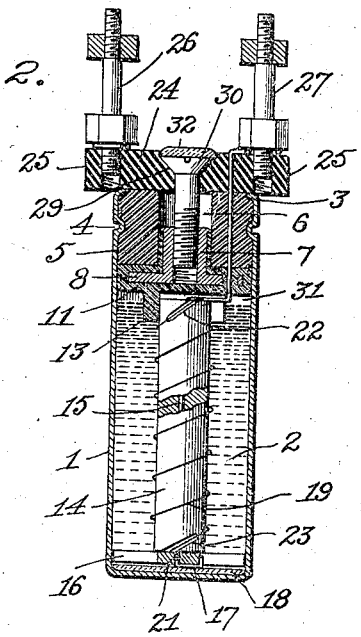
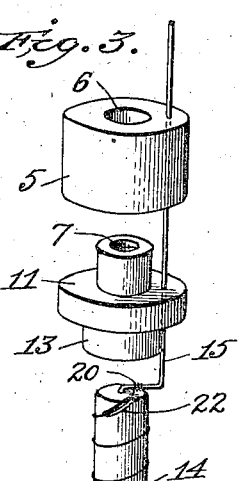
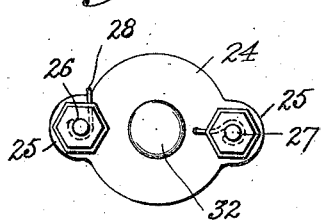
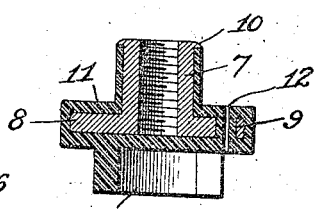
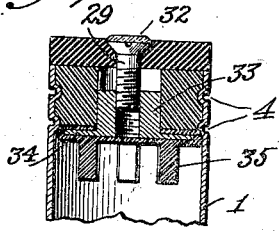
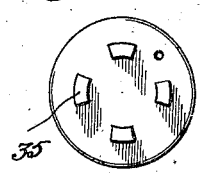
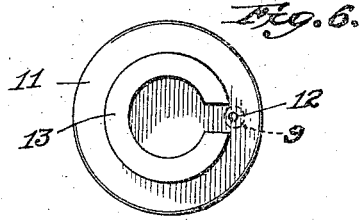
Witnesses
Inventor
M. E. Fuld
By
his Attorney

UNITED STATES PATENT OFFICE.

MANES E. FULD, OF BALTIMORE, MARYLAND.

ELECTRIC-BATTERY CELL.

960,222.   Specification of Letters Patent.   Patented May 31, 1910.

Application filed March 12, 1906. Serial No. 305,638.

*To all whom it may concern:*

Be it known that I, MANES E. FULD, a citizen of the United States, residing at Baltimore city, in the State of Maryland, have invented certain new and useful Improvements in Electric-Battery Cells, of which the following is a specification.

This invention relates more particularly to improvements in that class of battery cells known as dry cells, in which the receptacle carrying the electrolyte is sealed or tightly closed.

The chlorid-of-silver dry cells shown and described in U. S. Letters Patent Nos. 450,840; 479,541; 554,759; 554,760; 554,761; 572,285; and 612,326 may be taken as types of the general class of cells to which this invention relates and forms upon which the present invention constitutes an improvement. In the majority of cases, the cell proper or receptacle which contains the electrolyte in this class of cells is made of glass, and this glass cell is sealed by means of a plurality of plugs. Such cells not only entail a great amount of time and labor in sealing them, but the breakage of the glass due to expansion and contraction of the plaster seals and the freezing of the electrolyte in winter, and the breakage in transit is very great.

The object of this invention is the production of a dry cell which shall be free from the above faults and possess other advantages which will hereinafter more fully appear.

With the above object in view, my invention consists in the novel combination and arrangement of parts hereinafter described and more particularly pointed out in the accompanying claims.

In order to more fully describe my said invention, reference will be had to the accompanying drawings, wherein—

Figure 1 represents in side elevation a form of the said cell embodying my invention. Fig. 2, a central vertical section thereof; Fig. 3, a perspective view of one of the electrodes and two of the sealing plugs separated from each other; Fig. 4, a top plan view of the said cell; Fig. 5, an enlarged cross section of one of the follower sealing plugs employed in the type of cell shown in Figs. 1 and 2; Fig. 6, a bottom plan view thereof; Fig. 7, a central cross sectional view of the upper portion of a modified form of cell embodying my invention; and Fig. 8, a bottom plan view of the follower plug employed in said modified form.

In the accompanying drawings, 1 represents a tubular shell preferably of zinc permanently closed at one end. This shell, in the case shown, constitutes one of the electrodes of the cell and at the same time the receptacle for the other electrode and the electrolyte 2, which latter may be a zinc sulfate solution. The receptacle 1 is crimped inward at its upper end as at 3, and may be provided also with one or more annular crimps, such as 4, near its upper end. These crimps act as retainers for a compression sealing plug 5, preferably of soft or resilient rubber or rubber composition, inserted in the upper end of the receptacle 1. The plug 5 has a central opening 6 extending through it longitudinally of the cell, and into this opening extends a portion of a second plug, which forms a follower or clamping member for compressing the sealing plug 5. This latter plug is also provided with retaining means for holding in position one end of the inclosed electrode. This follower plug consists, among other parts, of an interiorly screw threaded metal sleeve 7, having at one end an integral annular flange 8, through which latter passes the opening 9. The upper end of the sleeve 7 may also be provided with a small flange 10.

Completely surrounding the sleeve 7 and its flange 8 is an insulating covering 11, preferably of resilient rubber vulcanized to said sleeve and flange and passing into the opening 9. There is an opening 12 through the insulating material 11 within the opening 9, through which opening 12 passes one of the terminals of the cell. Upon the lower face of the covering 11 is formed a collar 13, adapted to receive the upper end of the inclosed electrode. This electrode consists, in the case shown, of a mass of chlorid-of-silver molded in the form of a cylindrical stick 14, or in any other desired shape, around a conductor 15 extending longitudinally thereof. The conductor 15 is preferably a silver wire, and at its lower end passes through an insulating retaining piece 16 and is bent therearound as at 17. The outer edges of the retaining piece 16 engage the sides of the receptacle 1 and therefore act to keep the electrode 14 in position and to prevent the same from engaging the side of said receptacle. As a further precaution to prevent short circuiting, the lower end of the conductor 15 and retaining piece 16 rest upon a thickness of wax or other insulating material 18, which covers the bottom of the receptacle 1. A fine silver wire 19 is wound in helical formation on the exterior of the chlorid-of-silver stick 14 and is connected to the wire 15 at both ends of said stick, as at 20 and 21. In order to prevent this wire 19 from slipping where it passes over the upper and lower edges of said stick, I provide retaining shoulders at each end of the stick to engage and hold said wire in place. These shoulders may be formed by grooves 22 and 23 or otherwise. The wire 15, as it passes over the upper end of the stick 14 is bent substantially at right angles and passes beneath the lower side of the covering 11 and thence upward through the opening 12, through one side of the plug 5, and thence through a vulcanized fiber or other insulating cap 24 extending over the top of the receptacle 1 and plug 5. This cap 24 is provided with side extensions or wings 25 into which are screwed cell supporting binding posts 26 and 27. To the post 26 is connected a conductor 28 soldered to the outside of the receptacle 1, while post 27 is connected to wire 15. The cap 24 is provided with a countersunk central opening 29, through which passes the body portion of a screw 30 into the central opening of the plug 5, where the screw threads thereof engage with the screw threads of the sleeve 7.

When it is desired to assemble the cell and seal it, a suitable quantity of the electrolyte is placed in the receptacle 1 and the electrode 13 and the parts shown in Fig. 3 placed in the casing with the upper face of plug 5 about flush with the upper edge of the receptacle 1, and the lower face of the follower plug engaging the upper surface of the electrolyte so as to exclude as much air as possible from the cell. In the uncompressed condition in which the two plugs are inserted in the mouth of the receptacle, they do not close the said receptacle air tight and thus allow the air to escape therefrom. The cap 24, with the conductor 15 passing therethrough, is then placed over the top of the cell, and the screw 30 is passed through said cap and screwed into the sleeve 7. When the screw 30 is turned in one direction in the said collar, it draws the lower or follower plug toward the cap 24 and compresses the resilient plug 5 in the direction of the longitudinal axis of the cell, thus causing its distention laterally or in the direction of the inner side walls of the cell. By this means, the plug 5 may be made to fit with extreme tightness in the receptacle 1 and will be further held by the crimps 3 and 4 from any possibility of upward movement. This clamping action also causes a lateral distention of the rubber covering 11 on top of the flange 8 and around its edges, though to a lesser degree than in the case of the plug 5. When the lower plug is drawn toward the cap 24 in compressing the plug 5, a space 31 will be left between the upper surface of the electrolyte and the lower face of the lower plug, which space forms a receptacle for gases generated within said cell, thereby lessening the danger of explosion. After the screw 30 has been turned to a sufficient extent to properly compress the plug 5, a sealing composition 32 is placed over the head thereof in the countersunk portion of the cap 24 in such manner that it will be necessary to break the said seal in order to open the cell. The object of this seal is to enable the manufacturer to tell quickly and certainly whether or not the cell has been opened since it was sent out from the factory. Chlorid-of-silver cells of this character are quite valuable intrinsically owing to the silver which they contain, even after they have become unfit for use electrically, and for this reason it is the practice of the manufacturer to buy such cells back after they have become exhausted electrically. It is, therefore, a great advantage to the manufacturer to be able to tell quickly and certainly whether any of the valuable parts of the cells have been removed since leaving the factory. The seal 32 is preferably made of a composition, the constituent parts of which are known only to the manufacturer, so that the seals may not be broken and replaced by outsiders. When the cell is sealed, the terminals 28 and 15 are connected respectively to the binding posts 26 and 27, when the cell will be ready for use.

In Fig. 7 I have shown a modification of the follower plug shown in Fig. 2. In the modified form, the metal sleeve portion 33 of the follower plug is not covered with insulation, as in the first described form, and the flange portion 34 of said plug is covered with a coating of hard rubber having upon its lower face a series of projections 35 which take the place of the collar 13 of the form shown in Figs. 2 to 6. Also, in the modification, Fig. 7, the receptacle 1 is shown provided with two crimps 4 instead of one as in Figs. 1 and 2.

Other modifications may be made in my invention without departing from the spirit thereof. For example, I do not desire to limit the sealing arrangement to use with metal cells only, since it may also be used with porcelain, glass or other cells, in some instances, with good results. The same applies to the form of electrode herein claimed.

If desired, a plurality of cells constructed according to my present invention may be connected in multiple or in series or in any other combination and inclosed in a suitable cell case, and for this purpose I may employ a cell case and closure therefor such, for example, as that shown in U. S. Letters Patent No. 612,326, granted to me October 11, 1898.

What I claim is:

1. An electric battery cell, comprising a tubular receptacle, a resilient sealing plug inserted in one end of said receptacle and having a central opening extending therethrough longitudinally of said cell, a cap over the top of said receptacle, a screw passing through said cap into said opening in said plug and limited in its longitudinal movement in one direction by said cap, an insulated metallic follower adapted to travel on said screw and to engage the opposite face of said plug from said cap and also the interior side walls of said cell.

2. An electric battery cell, comprising a tubular receptacle, a resilient sealing plug inserted in one end of said receptacle and having a central opening extending therethrough longitudinally of said cell, a cap over the top of said receptacle, a screw passing through said cap into said opening in said plug and limited in its longitudinal movement in one direction by said cap, and a metallic follower covered with insulating material and adapted to travel on said screw and to engage the opposite face of said plug from said cap and also the interior side walls of said cell.

3. An electric battery cell, comprising a tubular receptacle, a resilient sealing plug inserted in one end of said receptacle and having a central opening extending therethrough longitudinally of said cell, said receptacle being crimped around said plug to retain the same, a cap over the top of said receptacle, a screw passing through said cap into said opening in said plug and limited in its longitudinal movement in one direction by said cap, and a rubber covered metallic follower adapted to travel on said screw and to engage the opposite face of said plug from said cap and also the interior side walls of said cell.

4. An electric battery cell, comprising a tubular receptacle, a resilient sealing plug inserted in one end of said receptacle and having a central opening extending therethrough longitudinally of said cell, said receptacle being crimped around said plug to retain the same, a cap over the end of said receptacle in which said plug is inserted, a screw having its head countersunk in said cap and its body passing through said cap into the central opening in said plug, and a follower adapted to travel on said screw and to engage the opposite face of said plug from said cap.

5. An electric battery cell, comprising a tubular receptacle, a resilient sealing plug inserted in one end of said receptacle and having a central opening extending therethrough longitudinally of said cell, said receptacle being crimped around said plug to retain the same, a cap over the end of said receptacle in which said plug is inserted, a screw having its head countersunk in said cap and its body passing through said cap into the central opening in said plug, a follower adapted to travel on said screw and to engage the opposite face of said plug from said cap, and a composition seal over the head of said screw.

6. In an electric battery cell, a sealing device comprising a metallic screw threaded collar having a flange with an opening therethrough adapted to receive one of the cell terminals, and an insulating coating extending over the said flange and into the said opening therein in which latter place it acts to insulate said terminal from said metal flange.

7. An electric battery cell, comprising a metallic tube permanently closed at one end and constituting one of the electrodes and a receptacle for the electrolyte, in combination with a resilient rubber sealing plug inserted in the other end of said tube and having a central opening extending therethrough longitudinally of said cell, said casing being crimped around said plug to retain the same, an insulating cap over the end of said tube in which said plug is inserted, a screw having its head countersunk in said cap and its body extending through said cap into the central opening in said sealing plug, a rubber covered metal follower threaded on said screw within the opening in said sealing plug and having a flanged portion adapted to engage the lower face of said plug and the interior side walls of said tube, an electrode-retaining projection on said follower, an electrode held thereby, an insulating support to retain the other end of said electrode in position, cell supporting binding posts secured to said cap, connections between said electrodes and said binding posts, and a seal over the countersunk head of the screw in said cap.

8. An electric battery cell, comprising an electrolyte receptacle, a resilient sealing plug inserted in one end thereof, clamping means to compress said plug, and electrode-retaining means on a portion of said clamping means.

9. An electric battery cell, comprising an electrolyte receptacle, a resilient sealing plug inserted in one end thereof having an opening extending longitudinally thereof, a cap over the top of said receptacle separate from said plug, a screw passing through said cap into said opening in said plug, a clamping follower adapted to travel on said screw and located on the opposite side of said plug from said cap, and an electrode-retaining lug carried by said follower.

10. An electric battery cell comprising a tubular receptacle, a resilient cell-sealing plug inserted in one end thereof and having a central opening passing longitudinally therethrough, a cap over the top of said cell separate from the said plug, cell supporting terminals secured to said cap, a screw passing through said cap into said opening in said plug, a clamping follower adapted to travel in said screw, and electrode-retaining means carried by said follower.

11. An electric battery cell, comprising a tubular receptacle, a resilient sealing plug inserted in one end of said receptacle and having a central opening extending therethrough longitudinally of said cell, a cap over the top of said receptacle, a screw passing through said cap into said opening in said plug and limited in its lateral movement in one direction by said cap, and an insulated metallic follower adapted to travel on said screw and to engage the opposite face of said plug from said cap.

12. An electric battery cell, comprising a receptacle, an electrolyte in said receptacle, a resilient sealing plug inserted in one end of said receptacle to confine said electrolyte, clamping means comprising a screw and a follower to compress said plug to cause the distention of the same in the direction of and against the inner side walls of the said receptacle, an electrode attached to said follower, and a terminal conductor passing from said electrode up through said follower and plug.

13. An electric battery cell, comprising a receptacle, a resilient sealing plug inserted in said receptacle, a cap over the top of said receptacle, a screw and follower arranged to coöperate with said cap to compress said plug to cause its distention in the direction of and against the side walls of said receptacle, an electrode in said electrolyte, and electrode retaining means attaching said electrode to said follower.

In testimony whereof I affix my signature in presence of two witnesses.

MANES E. FULD.

Witnesses:
C. B. HANCOCK,
G. HOWARD DUVALL.